United States Patent [19]

De Loach

[11] Patent Number: 4,512,784
[45] Date of Patent: Apr. 23, 1985

[54] CLOSED LOOP WATER TREATING SYSTEM

[76] Inventor: Walter W. De Loach, 818 Cattlemen Rd., Sarasota, Fla. 33582

[21] Appl. No.: 533,216

[22] Filed: Sep. 19, 1983

[51] Int. Cl.³ .................... B01D 19/00; B01D 53/14
[52] U.S. Cl. ............................... 55/196; 55/229; 55/233; 55/223; 210/209; 210/218; 261/22; 261/29
[58] Field of Search ............... 55/36, 38, 39, 53, 90, 55/89, 196, 227, 229, 233, 73; 210/718, 750, 210/696, 188, 198.1, 201, 209, 218, 615, 604, 620, 210/621, 150, 151; 261/22, 29, 114 R

[56] References Cited

U.S. PATENT DOCUMENTS

| | | | |
|---|---|---|---|
| 1,725,925 | 8/1929 | Kent | 210/750 |
| 2,858,903 | 11/1958 | Moetz et al. | 261/22 |
| 3,972,966 | 8/1976 | Lund et al. | 261/114 R |
| 4,198,378 | 4/1980 | Giammarco et al. | 423/223 X |
| 4,312,646 | 1/1982 | Fattinger et al. | 55/227 X |

OTHER PUBLICATIONS

"Flue Gas Desulfurization", Joy Manufacturing Company, 9/73.

Primary Examiner—Charles Hart
Attorney, Agent, or Firm—Claude A. Patalidis

[57] ABSTRACT

A system for treating water includes an aerator or degasifier that is fluidly connected to a blower that moves gases released from the water cascading down in the aerator over slat trays or plastic packing media. The released gases enter a gas scrubber and are treated with an iron salt solution that removes undesirable gases and that form a sludge that is removed from the scrubber. The residual gases, mostly nitrogen, argon, and other minor gases found in ambient air, flow into the aerator.

3 Claims, 2 Drawing Figures

CLOSED LOOP WATER TREATING SYSTEM

BACKGROUND OF THE INVENTION

This invention pertains to water treating and purification systems, and more particularly to a closed loop water treating system.

During the past few years, clean, pure water for personal consumption, and for industrial purposes, has become scarcer than ever before. Waste water, which is the effluent from industrial plants, is contaminating underground waters and poluted surface streams that flow into reservoirs from which potable water is drawn for human consumption and for industrial uses. Therefore, it is now mandatory that water treating and purification systems be established to treat these water problems.

SUMMARY OF THE INVENTION

A water treating system in accordance with the present invention comprises a closed loop configuration of apparatus that includes: a degasifier that receives contaminated water; slat trays within the degasifier that distribute the water as it cascades down the degasifier; and an air resistor at the bottom of the degasifier.

The closed loop water treating system also comprises a gas scrubber having spray heads that emit gas treating chemicals that mix and react with incoming gaseous fluid flowing from the degasifier into the scrubber; a sludge collector; high and low sensors that determine when more chemicals are required in the system; and air ports that conduct the treated gas to the bottom of the scrubber from which it flows into the degasifier.

For a further understanding of the invention and for features and advantages thereof, reference may be made to the following description of one embodiment of the invention taken in conjunction with the drawings thereof.

DETAILED DESCRIPTION

Figure 1:
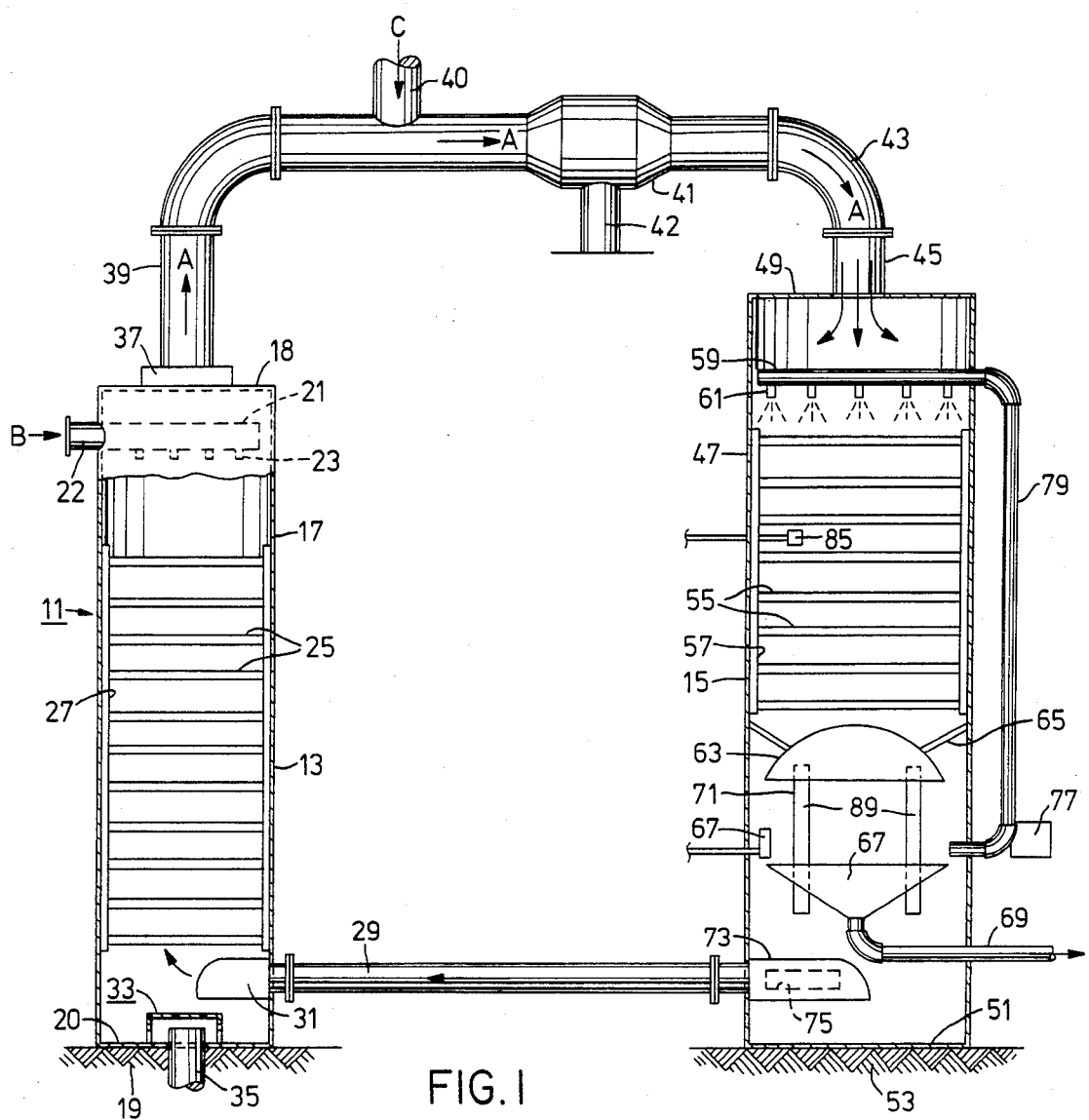
FIG. 1 is a schematic flow diagram illustrating equipment comprising a water treating system suitable for carrying into practice the method of the present invention.

Referring to FIG. 1, a closed loop water treating system 11 in accordance with the present invention includes a degasifier unit 13 and a scrubber unit 15.

The degasifier unit 13 comprises a closed vertical structure, an envelope 17, having a top 18 and a bottom 20. The envelope 17 is supported on the ground 19 or other suitable base. The degasifier unit 13 also a water inlet conduit 22 and water inlet header laterals 21 located within the envelope 17 and near the top 18 of the degasifier unit 13. Within the unit 13, there are a plurality of water spray heads 23 mounted into the water inlet header laterals 21. Beneath the water inlet header laterals 21 there are a plurality of conventional slat trays 25, mounted in a conventional manner to a molded fiber glass frame structure 27. The slat trays 25 are spaced apart vertically in a conventional manner, and are so constructed and arranged that the water is distributed over the surface of the trays 25 as it cascades downward within the envelope 17.

Extending into the envelope 17 near the bottom is a gas conduit 29 that is so constructed and arranged that the water cascading downward does not impede the flow of gas from the scrubber unit 15 into the envelope 17. The inner end portion of the gas conduit 29 is shaped, as at 31, to direct the water flow away from the entering flow of gas.

Figure 2:
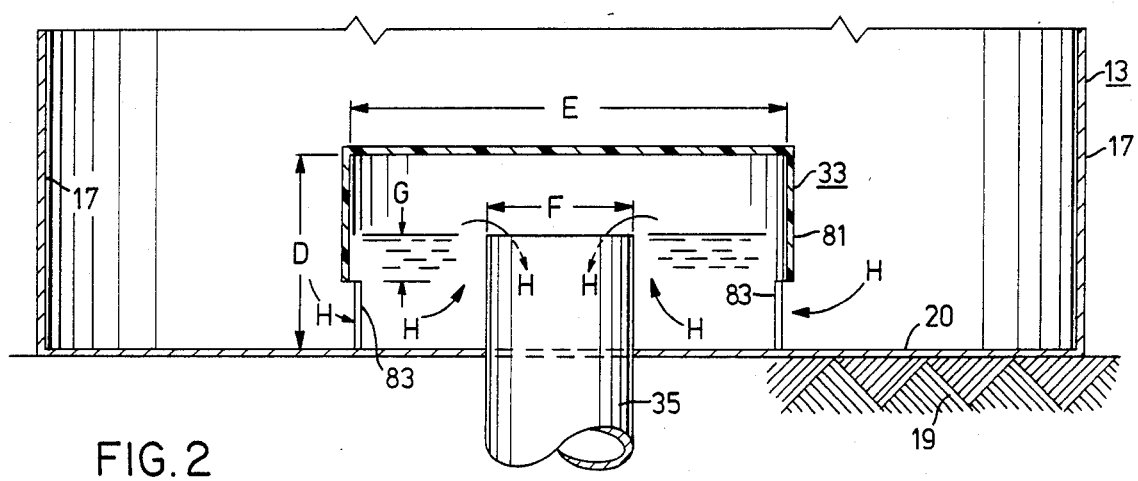
FIG. 2 is a schematic view of an air resistor forming a portion of the apparatus of FIG. 1.

The bottom of the degasifier unit 13 is provided with an air resistor 33 and a downcomer 35 for product water. The air resistor 33 and downcomer 35 are shown in FIG. 2 and are more particularly described hereinafter.

Disposed atop the degasifier unit 13 is a conventional demister 37 that prevents excessive loss of moisture from the degasifier 13.

Connected to the demister unit 37 is an exhaust gas conduit 39 that connects to the inlet end of a tube axial blower 41 that is suitably mounted to a support structure 42. The axial blower 41 is powered by a conventional electric motor (not shown) and is so arranged and constructed that the gas is withdrawn from the degasifier unit 13, through the demister 37, and is urged in the direction of the arrows A through the blower 41. Another conduit 43 connects the exhaust side of the axial blower 41 to the inlet conduit 45 of the gas scrubber 15.

Associated with the gas conduit 39 is an air make-up conduit 40 located about where shown in FIG. 1. The flow of ambient air in conduit 40 is controlled by means of a vacuum sensor (not shown) that determines when additional gaseous fluid is required to keep the system full at all times.

The gas scrubber unit 15 comprises a closed vertical structure including an envelope 47 and a top 49 and bottom 51. The scrubber unit 15, like the degasifier 13, is supported on the ground 53. The scrubber 15 contains a plurality of vertically spaced-apart slats 55 of conventional type that are supported by side frame structure 57. Preferably, the slats 55 and the frame structure 57 are molded fiber glass material.

Beneath the top 49 and within the scrubber 15, is a wash header 59 to which are mounted a plurality of spaced-apart spray heads 61.

Beneath the lowest slat 55, is an inverted dome-like shroud 63 that is suspended in position by support arms 65 fixed to the envelope 47.

Beneath the dome-like shroud 63, about where shown in FIG. 1, is a conical sludge collector 67 that is fitted with a drain pipe 69 at the bottom thereof.

A plurality of vertically arranged tubular air-relief conduits 71 are disposed about where shown, and they are so arranged that the tops thereof terminate within the dome-like shroud 63. The bottoms of the conduits 71 are located just below the sides of the conical shaped sludge collector 67.

Beneath the sludge collector 67 and the drain pipe 69 is a hood 73 covering a conventional dewaterer unit 75. The hood 73 is connected fluidly to the gas conduit 29 outside the envelope 47.

The wash header 59 is connected to a ferrous sulfate recirculating pump 77 by means of conduit 79.

The air resistor 33 comprises an inverted hood 81 that is made, preferably of fiber glass, and that has a plurality of ports 83 in the bottom edge of the hood 81 to permit water to flow into the hood 81. The inverted hood 81 covers the product water drain pipe 35, thereby creating a space within the hood 81 between the top of the product water drain pipe 35 and the top of the hood 81.

When the water treating system is in operation, product water flows in the direction of the arrows H, from the bottom of the envelope 17, through the ports 83, into the air resistor 33 and thence into the product water drain pipe 35.

Those skilled in the art will recognize that, when the system is operating, there is created within the air resistor 33 a minimum water column in inches represented by the dimension G.

The dimensions indicated by the letters D, E and F are determined by the volume of water to be treated. The size and number of the ports 83 are determined by both the flow rate and the water column in inches G to be created so as to prevent air from entering the product water drain pipe 35. The dimension G will be great enough to maintain a water column in inches that is greater than the static pressure within the envelope 17. Wherefore, air in the envelope 17 must flow upward through the media or slat trays 25, and not down the product water drain pipe 35.

Again, when the water treating system is in operation, the gas in the degasifier unit 13 is drawn upward through the media or slat trays 25 by the action of the axial blower 41, in the direction of the arrows A, and thence into the scrubber unit 15 where the gas is first treated with iron salts such as ferrous sulfate issuing from the spray heads 61. The treated gas then passes downward through the slats 55 and both high sensors 85 and low sensors 87, operating electrically, detect when additional iron salt solution is required in the system.

The iron salt solution, when it contacts the gases containing water and oxygen entering the scrubber 15, creates a sludge that precipitates onto the dome-like shroud and thence into the sludge collector 67. Thereafter, the sludge flows through the conduit 69, and is collected for further disposal elsewhere.

The gas in the lower portion or zone of the scrubber 15 is treated with caustic to remove carbon dioxide. The gas in the bottom of the scrubber then is practically only nitrogen which passes through the dewaterer unit 75 and thence through the conduit 29 into the lower part of the degasifier 13.

Located in the lower portion of the scrubber are a plurality of air relief ports or tubes 89; four such relief ports or tubes are generally required to carry the air from under the dome-like shroud to the lower zone in the scrubber unit.

From the foregoing description of one embodiment of the invention, persons skilled in the art will recognize many features and advantages thereof among which the following are significant:

That there is no exhaust air flow; wherefore, there are no obnoxious gaseous odors released to the atmosphere;

That there is no dissolved oxygen in the product water; wherefore, equipment required to use pure water such as steam boilers, potable water piping and pumps and the like have a much greater active life since the water is free of corrosive chemicals;

That a proper proportion of iron salts in the system is controlled by sensors;

That the air resistor prevents contaminated air from being carried away from the degasifier with the product water;

That the required volume of make-up air to keep the system full at all times is admitted when necessary; and That the system of the present invention may be used to pretreat water since the system eliminates oxygen from contacting the treated water and therefore does not cause dissolved materials to precipitate out and foul other systems.

Although the invention has been described in relation to one embodiment thereof, it is understood that other modifications may be made therein without departing from the spirit thereof and the scope of the appended claims

What is claimed is:

1. A raw water treating system comprising in combination:
    (a) a first chamber formed by a first envelope having a top and a bottom;
    (b) a first frame structure disposed within said envelop;
    (c) a plurality of slat trays supported by said first frame structure and disposed in spaced apart vertical orientation within said first envelope;
    (d) a raw water inlet conduit mounted to said first envelope adjacent the top thereof and fluidly communicating with said first chamber, said conduit having a plurality of spray heads mounted thereto within said envelope;
    (e) a gas inlet conduit mounted to said first envelope adjacent the bottom thereof;
    (f) a product water conduit mounted to said bottom and protruding thereabove;
    (g) an air resistor mounted to said bottom within said envelope and surrounding said product water conduit;
    (h) a demister mounted to said top and disposed outside of said first envelope and fluidly communicating with said first chamber;
    (i) a second chamber formed by a second envelope having a top and a bottom;
    (j) a second frame structure disposed within said second envelope;
    (k) a plurality of slat trays supported by said second frame structure and disposed in spaced apart vertical orientation;
    (l) a gas inlet conduit mounted to said top and fluidly communicating with said second chamber;
    (m) a wash header conduit disposed in said second chamber beneath said top and above said slat trays;
    (n) collecting means mounted within said second envelope beneath said slat trays for receiving precipitate material;
    (o) means for removing precipitate material from said collecting means;
    (p) shroud means above said collecting means and beneath said slat trays for preventing said precipitate material from entering a plurality of
    (q) air relief ports disposed beneath said shroud means, said ports being so constructed and arranged that gaseous fluid is carried from beneath said shroud to a zone beneath said collector;
    (r) conduit means for carrying iron salt solution to said wash header;
    (s) pump means for moving said iron solution in said conduit means;
    (t) means within said second chamber for determining when more iron salt solution is needed in said conduit means;
    (u) means for removing gaseous fluid from the bottom zone of said second chamber;
    (v) means for dewatering said gaseous fluid before it is removed from said second chamber;
    (w) means for conducting said gaseous fluid into said first chamber; and (x) means for conducting gas from said demister into a top zone of said second chamber.

2. The water treating system of claim 1 including:

(a) powered means for withdrawing gaseous fluid from said first chamber and moving said fluid into said second chamber.

3. The water treating system of claim 2 including:

(a) means for conducting make-up air into said system.

* * * * *

UNITED STATES PATENT AND TRADEMARK OFFICE
CERTIFICATE OF CORRECTION

PATENT NO. : 4,512,784

DATED : April 23, 1985

INVENTOR(S) : Walter W. De Loach

It is certified that error appears in the above-identified patent and that said Letters Patent are hereby corrected as shown below:

Col. 1, line 58, after "13" insert --includes--.

Col. 4, line 52, change "(g)" to --(q)--.

Col. 4, line 58, after "iron" insert --salt--.

Signed and Sealed this

Twenty-fourth Day of September 1985

[SEAL]

Attest:

DONALD J. QUIGG

Attesting Officer

Commissioner of Patents and Trademarks—Designate